United States Patent [19]
Krantz

[11] Patent Number: 5,832,209
[45] Date of Patent: Nov. 3, 1998

[54] SYSTEM AND METHOD FOR PROVIDING OBJECT AUTHORIZATION IN A DISTRIBUTED COMPUTED NETWORK

[75] Inventor: David R. Krantz, Lexington, S.C.

[73] Assignee: NCR Corporation, Dayton, Ohio

[21] Appl. No.: 763,862

[22] Filed: Dec. 11, 1996

[51] Int. Cl.⁶ .................................................. B08F 11/00
[52] U.S. Cl. ....................................................... 345/182.1
[58] Field of Search ........................... 395/187.1, 188.01, 395/186; 707/103, 9; 364/286.4, 286.5; 380/21

[56] References Cited

U.S. PATENT DOCUMENTS

| | | | |
|---|---|---|---|
| 5,008,853 | 4/1991 | Bly et al. | 364/90 |
| 5,032,979 | 7/1991 | Hecht et al. | 364/200 |
| 5,241,624 | 8/1993 | Torres | 707/103 |
| 5,276,901 | 1/1994 | Howell et al. | 707/9 |
| 5,359,721 | 10/1994 | Kempf et al. | 395/425 |
| 5,371,851 | 12/1994 | Pieper et al. | 395/164 |
| 5,375,244 | 12/1994 | McNair | 395/725 |
| 5,469,576 | 11/1995 | Dauerer et al. | 395/186 |
| 5,481,720 | 1/1996 | Loucks et al. | 395/187.01 |
| 5,504,892 | 4/1996 | Atsatt et al. | 707/103 |
| 5,506,961 | 4/1996 | Carlson et al. | 395/186 |
| 5,542,046 | 7/1996 | Carlson et al. | 395/186 |
| 5,657,452 | 8/1997 | Kralowetz et al. | 395/187.01 |
| 5,682,478 | 10/1997 | Watson et al. | 395/187.01 |
| 5,742,759 | 4/1998 | Nessett et al. | 395/187.01 |

*Primary Examiner*—Albert De Cady
*Assistant Examiner*—Scott T. Baderman
*Attorney, Agent, or Firm*—William A. Munck

[57] ABSTRACT

For use in a computer network having first and second endpoints coupled thereto, a target application object being instantiatable on the first endpoint and a corresponding surrogate application object being instantiatable on the second endpoint, a secure system for, and method of, allowing the target application object to authenticate and authorize the surrogate application object and a computer network employing the system or the method. The system includes: (1) a first security target object, instantiatable on a central security endpoint coupled to the computer network, for instantiating and authenticating a corresponding first security surrogate object on the first endpoint and associated with the target application object and (2) a second security target object, instantiatable on the central security endpoint, for instantiating and authenticating a corresponding second security surrogate object on the second endpoint and associated with the surrogate application object, the central security endpoint creating an authorization code to authorize the first and second security target objects and thereby authorize the first and second security surrogate objects to enable operation of the target and surrogate application objects without requiring the authorization code to be transmitted through the computer network.

20 Claims, 2 Drawing Sheets

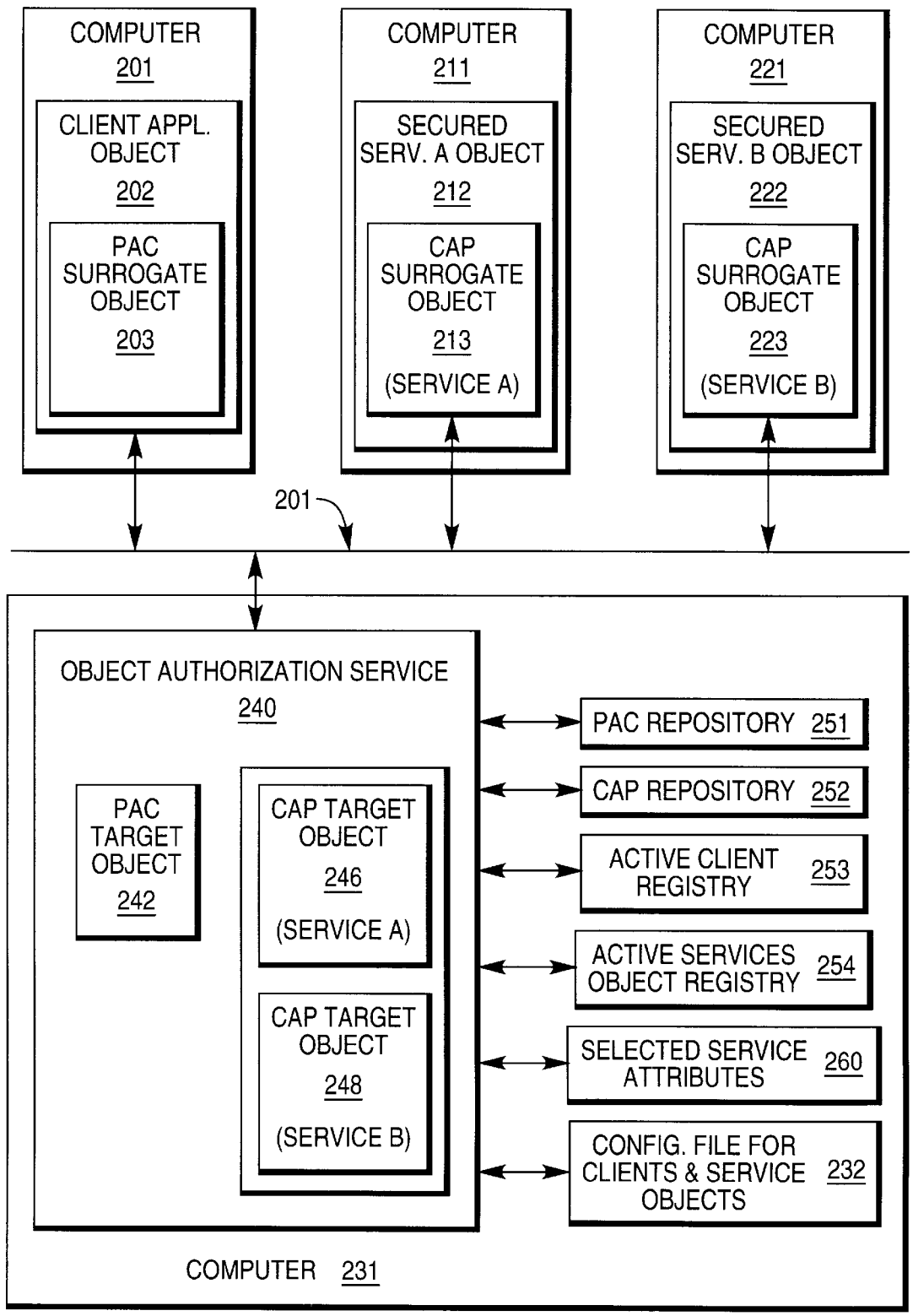

SYSTEM AND METHOD FOR PROVIDING OBJECT AUTHORIZATION IN A DISTRIBUTED COMPUTED NETWORK

TECHNICAL FIELD OF THE INVENTION

The present invention is directed, in general, to computer network security and, more specifically, to a system and method for providing security through centralized object authorization in a distributed computer network.

BACKGROUND OF THE INVENTION

Programmers are using object-oriented programming techniques more widely in order to increase developer productivity and reusability of designs. This trend is demonstrated by the large number of C++ software tools that support the development of distributed client/server systems. Software objects contain one or more procedures and associated data for carrying out an operation and, in some cases, interacting with other objects.

In the distributed client/server environment, objects are frequently broken into a local object, called a surrogate, and a remote object, called a target, located somewhere else in the network. A client object on a local system may be comprised of many surrogate objects, each of which engages in a session with a different remote target. The remote target objects may reside in many different remote computers on a network. The use of distributed objects dispersed across a network allows the local (surrogate) copy of the object to execute as if the entire object (including all remote target copies) were present on the local system.

The distributed nature of some objects, however, creates system security problems when system users, client applications and service applications use objects that are distributed across a number of nodes in a large network. Many of the computer security services designed in the 1970's and 1980's were designed for procedural based systems. These services rely heavily on "log-in" control and file system control to prevent unauthorized access to a secured computer and are generally incompatible with, or inadequate for securing, network computer systems. This stems, in part, from the fact that large computer networks may be accessed by many users from many different locations, including modem dial-in locations, making the use of secured terminals infeasible. The situation is further complicated by the fact that different clusters of computers connected by a network are frequently not commonly owned and have independent security systems. This results in non-uniform enforcement of enterprise-wide security procedures. Finally, objects themselves frequently contain both secured data and member functions, thereby requiring a different approach to the security problem altogether.

There is, therefore, a need in the art for systems and methods for secured object authorization in a network of distributed computers that implement object-oriented applications. Such systems and methods should include security services that address security threats to authentication services, attribute services, authorization services, replication services, and fault tolerant platforms.

SUMMARY OF THE INVENTION

To address the above-discussed deficiencies of the prior art, the present invention provides, for use in a computer network having first and second endpoints coupled thereto, a target application object being instantiatable on the first endpoint and a corresponding surrogate application object being instantiatable on the second endpoint, a secure system for, and method of, allowing the target application object to authenticate and authorize the surrogate application object and a computer network employing the system or the method. The system includes: (1) a first security target object, instantiatable on a central security endpoint coupled to the computer network, for instantiating and authenticating a corresponding first security surrogate object on the first endpoint and associated with the target application object and (2) a second security target object, instantiatable on the central security endpoint, for instantiating and authenticating a corresponding second security surrogate object on the second endpoint and associated with the surrogate application object, the central security endpoint creating an authorization code to authorize the first and second security target objects and thereby authorize the first and second security surrogate objects to enable operation of the target and surrogate application objects without requiring the authorization code to be transmitted through the computer network.

The present invention therefore introduces the concept of a separate security system that is "overlaid" on the computer network, providing a central location for authenticating objects distributed throughout the network. The present invention achieves security by confining transmission of the authorization code(s) to within the central security endpoint. Since the authorization code(s) are not transmitted through the network to other endpoints, security is not compromised. "Endpoint," as the term is used herein, is used in its broadest sense to encompass any network node or system, including but not limited to a computer, telecommunications equipment or other electronic apparatus that may be networked and that is capable of supporting an object.

In a preferred embodiment of the present invention, the first endpoint is a server for the computer network and the second endpoint is a client for the computer network. Of course, the present invention is also operable within a master/slave network or within a peer-to-peer network.

In a preferred embodiment of the present invention, the first and second security target objects communicate security information therebetween to authorize the first and second security surrogate objects. In an embodiment to be illustrated and described, communication of the security information is an ongoing process, as application objects are instantiated and are called upon to cooperate with their surrogate or target counterparts. Of course, the first and second security target objects may perform a one-time authorization and thereafter cease communication of security information.

In a preferred embodiment of the present invention, the central security endpoint creates the authorization code after authenticating a selected one of the group consisting of: (1) an identity of the second endpoint, (2) an identity of a user of the second endpoint and (3) the surrogate application object. In the embodiment to be illustrated and described, these and other types of information are employed to ensure that activity occurring on the computer network is properly authorized.

In a preferred embodiment of the present invention, the first and second security target objects authorize the first and second security surrogate objects by returning a conditional positive acknowledgment to the initial required authentication request and a randomly generated ID.

In a preferred embodiment of the present invention, the central security endpoint maintains a repository of first and second security target objects to allow a plurality of first and second security surrogate objects to be instantiated on a corresponding plurality of further endpoints of the computer network. Again, the present invention provides a central security "overlay" to the network. In this embodiment, the central security endpoint governs authentication for at least two distributed security objects.

In a preferred embodiment of the present invention, the first and second security target objects issue positive authentication acknowledgments to the first and second security surrogate objects, respectively. Those skilled in the art are familiar with the ability of well-known encryption methods to allow the identity of people or things to be authenticated. The present invention takes advantage of authentication through encryption to allow the distributed counterparts of objects to authenticate one another without compromising the security of the authentication process itself.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates an exemplary computer network incorporating an exemplary object authorization service in accordance with the principles of the present invention.

DETAILED DESCRIPTION

Figure 1:
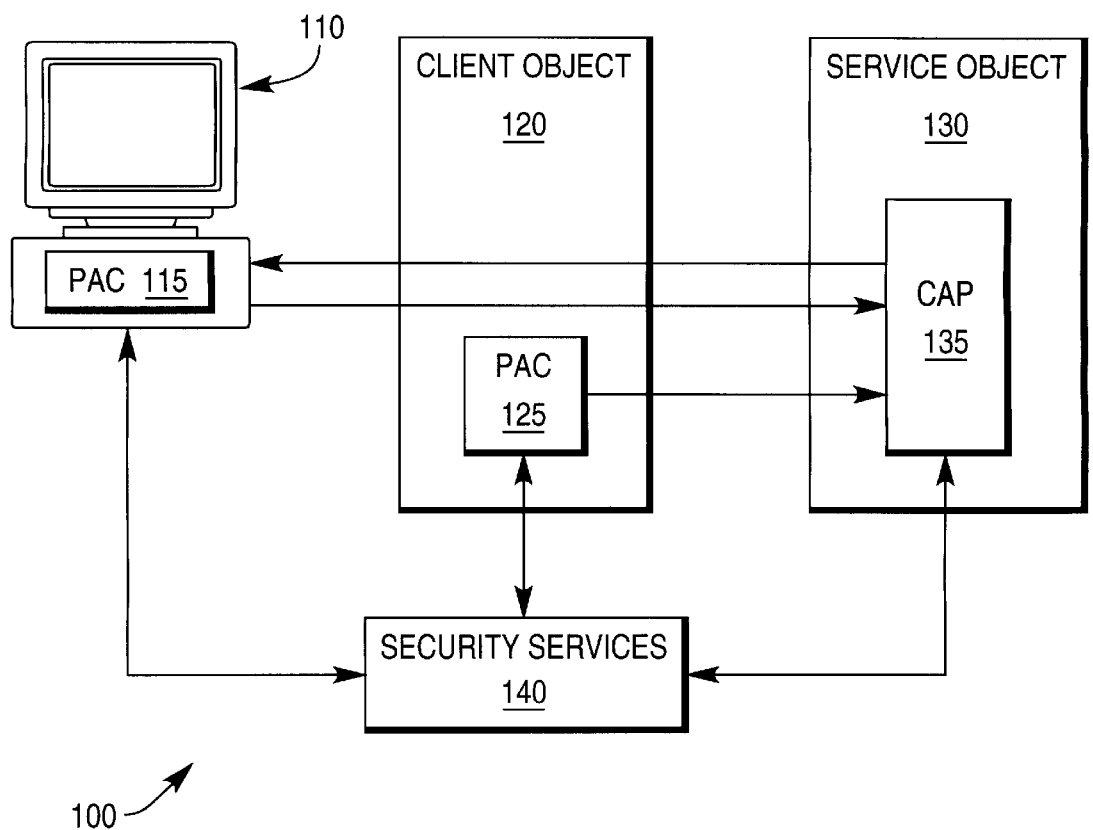
FIG. 1 illustrates an exemplary PRIOR ART computer system that incorporates security services for distributed objects.

Referring initially to FIG. 1, illustrated is an exemplary PRIOR ART computer system (generally designated 100) that incorporates security services for distributed objects. Computer system 100 includes a personal computer (PC) 110, a client object 120 and a service object 130. "Include" and its derivatives, as used herein, means inclusion without limitation.

Exemplary client object 120 may be one of a plurality of surrogate objects used by a client application being executed by PC 110. Alternatively, client object 120 may be used by a client application resident in a local processing system separate from PC 110. In either case, client object 120 is a surrogate object used by PC 110 to perform an operation. Service object 130 is a target object used by a server application in a server remote from client object 120 and PC 110. Service object 130 interacts with the surrogate object (client object 120) through a computer network connection. In this way, PC 110 performs its task using a distributed object, in which the surrogate portion (client object 120) in the local system serves as a functional proxy for the complete object. A large portion of the processing capability and state information of the complete object may actually reside in the target portion (service object 130) of the distributed object, which may be located in one or more remote servers in the computer network.

To prevent unauthorized access or possible destruction of the secured information in the target object, client object 120 and service object 130 use a security handshake. To accomplish this, a special type of "lock and key" object is used. The "key" object is called a Privilege Attribute Certificate (PAC) and the lock object is called a Control Attribute Package (CAP). The PAC object is used by the surrogate object in a client application to identify the user, identify what tasks, operations, data, etc., the user may access, according to the user's security clearance, and identify where the client application is running. The CAP object is used by the target object in the server application to authorize the interaction of the target and surrogate objects.

The client application initiates contact with the server application and passes the PAC information (the "key") to the CAP (the "lock"). If the CAP determines that the surrogate (client object 120) has presented an unauthorized PAC to the target (service object 130), the surrogate and the PAC will be locked out and the operation will fail. Thus, CAPs control and authorize access to secured service objects only by authorized PACs.

In FIG. 1, PAC 115 is used by a client application executed in PC 110 to interact with CAP 135 in service object 130. Alternatively, PC 110 may use client object 120 in a client application resident in a local processing system separate from PC 110. PAC 125 is used by client object 120 to interact with CAP 135 in service object 130. CAP 135 performs the necessary security services 140 to authenticate the user and the user's privileges, as outlined above.

The above-described system is flawed due to the distributed nature of the surrogate and target objects. The PAC information may be passed to numerous nodes in the network in order to access the distributed pieces of the service object. This dispersal of the PAC information may allow an unauthorized user to retrieve the PAC information from one of the nodes and gain access to secured services on the network.

U.S. Pat. No. 5,506,961 to Carlson et al. discloses a peer-to-peer connection authorizer that employs tokens to effect communication between a client computer and a server computer. The teachings of U.S. Pat. No. 5,506,961 are hereby incorporated by reference into the present disclosure as if fully set forth herein. As will be further explained below, the present invention does not employ tokens and therefore obviates the complexities associated therewith, including token type, transmission, encryption, etc. The present invention also does not rely on access decisions made in either the client computer or server computer, or in their respective memory spaces, as in the authorization system described in U.S. Pat. No. 5,506,961. Rather, the present invention restricts all access decisions to distributed CAP and PAC target objects located within the confines of the disclosed object authorization system.

Conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993); conventional data communications is more fully discussed in *Voice and Data Communications Handbook*, by Bud Bates and Donald Gregory, McGraw-Hill, Inc. (1996), Data *Communications*

*Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992); and conventional circuit design is more fully discussed in *The Art of Electronics*, by Paul Horowitz and Winfield, Cambridge University Press (2nd ed. 1991). Each of the foregoing publications is incorporated herein by reference for all purposes.

Turning now to FIG. 2, illustrated is an exemplary computer network (generally designated 200) incorporating an exemplary object authorization service 240 in accordance with the principles of the present invention. Computer network 200 includes a plurality of nodes, such as computers 201, 211, 221, and 231, communicating via bus link 201 in a conventional bus configuration, such as Token Ring or Ethernet, as examples.

Object Authorization Service (OAS) 240, which illustratively resides in computer 231, uses distributed PACs (keys) and distributed CAPs (locks) to provide security services to secured services in computer network 200. OAS 240 retains all CAP and PAC target information.

An most advantageous object authorization process begins when a surrogate object, such as exemplary client application object 202, in a client application attempts to interact with one or more secured service surrogate objects, such as secured Service A object 212 and secured Service B object 222. Client application object 202 creates (or instantiates) PAC surrogate object 203, which goes in session across the network with corresponding PAC target object 242, located in OAS 240. OAS 240 verifies (or authenticates) the identity of PAC surrogate object 203, the client application name, and the name of the client computer (computer 201). The name of the user may be verified additionally by computer 201 or by OAS 240, or by both. Next, OAS 240 creates an authorization code for PAC surrogate object 203, stores it within OAS 240, and returns a positive authentication acknowledgment (PAA) to PAC surrogate object 203. In a preferred embodiment, OAS 240 also returns a unique, randomly-generated authorization (ID).

In alternate embodiments, PAC surrogate object 203 may initially randomly generate its own unique ID. However, the authorization code and the data in the PAC object itself remain in PAC target object 242 within OAS 240 for future use, possibly for as long as client application object 202 is active in the system. Permissions for the PAC and the authorization code are most preferably not sent over the network. PAC surrogate object 203 is aware that it has an authorization code and is authorized to function, but does not know the specific value of the authorization code.

In a similar manner, a CAP object is created by the server application. For example, CAP surrogate object 213, which is associated with secured Service A, is instantiated by secured Service A object 212 and goes in session with corresponding CAP target object 246 in OAS 240. Information contained in the CAP object may be obtained from local memory which stores selected service attributes. OAS 240 authenticates the identity of CAP surrogate object 213, the name of the server application, and the name of the server computer (computer 211). Next, OAS 240 creates an authorization code for CAP surrogate object 213, stores it within OAS 240, and returns a positive authentication acknowledgment (PAA) to CAP surrogate object 213 associated with the server application.

In a preferred embodiment, OAS 240 also returns a unique, randomly-generated authorization (ID). In alternate embodiments, CAP surrogate object 213 may initially randomly generate its own unique ID. The CAP authorization code and the CAP data are kept in CAP target object 246 for as long as secured service A is active in the system. Although the CAP authorization code is never sent over the network, CAP surrogate object 213 is aware that it has an authorization code and is authorized to interact with the client application. As in the case of PAC objects, CAP surrogate object 213 does not know the specific value of the CAP authorization code.

At this point, all necessary CAP and PAC objects have been authorized by OAS 240. After the authentication phase for creating distributed PAC and CAP objects is complete, PAC and CAP objects are authorized by the OAS to operate in the computer network and the authorizations are bound to the PAC and CAP target objects and their associated IDs by OAS 240. The only information PAC and CAP surrogate objects actually know about themselves is their own ID, independent of any access permissions associated with user principals, client applications, server applications or computers. All sensitive information regarding user credentials and privileges is still confined to OAS 240. The CAP and PAC security objects have the ability to interact. However, because all CAP and PAC processing occurs within the associated CAP and PAC target components inside OAS 240, their effectiveness is under direct control of OAS 240.

When work is to be done by the client application and server applications, the client application contacts the server application and a PAC/CAP "handshake" occurs. The handshake actually occurs in OAS 240 between PAC target object 242 and CAP target object 246, rather than between PAC surrogate object 203 and CAP surrogate object 213. OAS 240 issues a CONTINUE or STOP instruction to the CAP in the server application after the PAC/CAP handshake, depending on the authorized privilege attributes assigned to the PAC, and the server application will either perform or reject the client application request(s) accordingly.

OAS 240 maintains the identity of each PAC target object and its associated data, including privilege attributes, in PAC repository 251. Similarly, OAS 240 maintains the identity of each CAP target object and its associated data in CAP repository 252. Additionally, a list of active client applications is maintained in an active client registry 253 and a list of active secured services is maintained in active services object registry 254. OAS 240 accesses configuration files 232 for all client objects and service objects in a local memory associated with computer 231.

PAC target object 242 may interact with more than one CAP target objects. For example, the secured services required by the client application on computer 201 may be distributed across computer 211 and 221. In such a case, secured service B object 222 instantiates CAP surrogate object 223, which interacts with corresponding CAP target service object 248 in OAS 248. PAC/CAP handshakes in OAS 240 then occur between PAC target object 242 and CAP target object 248, as well as between PAC target object 242 and CAP target object 246.

Those skilled in the art will understand that the various computers and networks set forth hereinabove may be suitably combined with or replaced by any micro-, personal, mini-, mainframe or super computer, as well as network combinations of the same. In point of fact, the principles of the present invention may be implemented alternatively in any appropriately arranged device having processing circuitry. Processing circuitry may include one or more conventional processors, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like, to form the various types of circuits, controllers and systems described and claimed herein.

As is apparent from the above, the present invention provides, for use in a computer network having first and second endpoints coupled thereto, a target application object being instantiatable on the first endpoint and a corresponding surrogate application object being instantiatable on the second endpoint, a secure system for, and method of, allowing the target application object to authenticate and authorize the surrogate application object and a computer network employing the system or the method.

The system includes: (1) a first security target object, instantiatable on a central security endpoint coupled to the computer network, for instantiating and authenticating a corresponding first security surrogate object on the first endpoint and associated with the target application object and (2) a second security target object, instantiatable on the central security endpoint, for instantiating and authenticating a corresponding second security surrogate object on the second endpoint and associated with the surrogate application object, the central security endpoint creating an authorization code to authorize the first and second security target objects and thereby authorize the first and second security surrogate objects to enable operation of the target and surrogate application objects without requiring the authorization code to be transmitted through the computer network.

Although the present invention and its advantages have been described in detail, those skilled in the art should understand that they can make various changes, substitutions and alterations herein without departing from the spirit and scope of the invention in its broadest form.

What is claimed is:

1. For use in a computer network having first and second endpoints coupled thereto, a sucure system for allowing a client application object on said first endpoint to interact with a secured service object on said second endpoint comprising:

a central security endpoint coupled to said computer network for creating a first authorization target object capable of interacting with a first authorization surrogate object associated with said client application object on said first endpoint and for creating a second authorization target object capable of interaction with a second authorization surrogate object associated with said secured service object on said second endpoint, said first authorization target object and said second authorization target object thereby enabling interaction of said client application object and said secured service object without requiring an authorization code to be transmitted through said computer network.

2. The system as recited in claim 1 wherein said first endpoint is a client for said computer network and said second endpoint is a server for said computer network.

3. The system as recited in claim 1 wherein said first and second authorization target objects communicate security information within said central security endpoint to authorize interaction of said client application object and said secured service object.

4. The system as recited in claim 1 wherein said central security endpoint creates said authorization code after authenticating a selected one of the group consisting of:

an identity of said first endpoint, an identity of a user of said first endpoint, and said client application object.

5. The system as recited in claim 1 wherein said first and second authorization target objects authorize said first and second authorization surrogate objects by returning positive authentication acknowledgments to said first and second authorization surrogate objects.

6. The system as recited in claim 1 wherein said central security endpoint maintains a repository of first and second authorization target objects to allow a plurality of first and second authorization surrogate objects to be instantiated on a corresponding plurality of further endpoints of said computer network.

7. The system as recited in claim 5 wherein said first and second authorization target objects further return randomly generated identifications to said first and second authorization surrogate objects.

8. For use in a computer network having first and second endpoints coupled thereto, a method of allowing a client application object on said first endpoint to interact with a secured service object on said second endpoint, the method comprising the steps of:

creating on a central security endpoint coupled to said computer network a first authorization target object capable of interacting with a first authorization surrogate object associated with said client application object on said first endpoint; and creating on said central security endpoint a second authorization target object capable of interaction with a second authorization surrogate object associated with said secured service object on said second endpoint, wherein said first authorization target object and said second authorization target object enable interaction of said client application object and said secured service object without requiring an authorization code to be transmitted through said computer network.

9. The method as recited in claim 8 wherein said first endpoint is a client for said computer network and said second endpoint is a server for said computer network.

10. The method as recited in claim 8 further comprising the step of communicating security information within said central security endpoint between said first and second authorization target objects to authorize interaction of said client application object and said secured service object.

11. The method as recited in claim 8 wherein said step of creating comprises the step of creating said authorization code after authenticating a selected one of the group consisting of:

an identity of said first endpoint, an identity of a user of said first endpoint, and said client application object.

12. The method as recited in claim 8 further comprising the step of authorizing said first and second authorization surrogate objects by transmitting positive authentication acknowledgments in response to authorization requests received from said first and second authorization surrogate objects.

13. The method as recited in claim 8 further comprising the step of maintaining a repository of first and second authorization target objects in said central security endpoint to allow a plurality of first and second authorization surrogate objects to be instantiated on a corresponding plurality of further endpoints of said computer network.

14. The method as recited in claim 12 wherein said step of authorizing said first and second authorization surrogate objects further includes the step of transmitting randomly generated identifications to said first and second authorization surrogate objects.

15. A computer network, comprising:
   a plurality of interconnected endpoints, one of said plurality of endpoints being designated as a server and another of said plurality of endpoints being designated as a client;
   a network operating system for governing communication of data among said plurality of endpoints; and
   a secure system, executable within said network operating system on a central security endpoint of said computer network, for allowing a client application object on said client to interact with a secured service object on said server, said secure system comprising:
   a first authorization target object capable of interacting with a first authorization surrogate object associated with said client application object on said client and a second authorization target object capable of interaction with a second authorization surrogate object associated with said secured service object on said server, said first authorization target object and said second authorization target object thereby enabling interaction of said client application object and said secured service object without requiring an authorization code to be transmitted through said computer network.

16. The computer network as recited in claim 15 wherein said first and second authorization target objects communicate security information within said central security endpoint to authorize interaction of said client application object and said secured service object.

17. The computer network as recited in claim 15 wherein said central security endpoint creates said authorization code after authenticating a selected one of the group consisting of:
   an identity of said client,
   an identity of a user of said client, and
   said client application object.

18. The computer network as recited in claim 15 wherein said first and second authorization target objects authorize said first and second authorization surrogate objects by transmitting positive authentication acknowledgments to said first and second authorization surrogate objects.

19. The computer network as recited in claim 15 wherein said central security endpoint maintains a repository of first and second authorization target objects to allow a plurality of first and second authorization surrogate objects to be instantiated on a corresponding plurality of further endpoints of said computer network.

20. The computer network as recited in claim 17 wherein said first and second authorization target objects further return randomly generated identifications to said first and second authorization surrogate objects.

* * * * *